United States Patent [19]

McKenzie

[11] 3,845,414

[45] Oct. 29, 1974

[54] SHIELDING APPARATUS FOR A SIGNAL SPLITTER AND SIGNAL SPLITTER INCLUDING THE SAME

[75] Inventor: Robert W. McKenzie, Lewisville, Tex.

[73] Assignee: Collins Radio Company, Dallas, Tex.

[22] Filed: Nov. 16, 1973

[21] Appl. No.: 416,482

[52] U.S. Cl. .................... 333/6, 174/71 C, 174/92, 333/9

[51] Int. Cl. .................... H01p 5/12

[58] Field of Search ........ 174/71 R, 71 C, 72 R, 87, 174/88 C, 92; 333/6, 8, 9; 403/174, 178, 218

[56] References Cited

UNITED STATES PATENTS

| | | | |
|---|---|---|---|
| 1,225,366 | 5/1917 | Schoenman et al. | 174/72 R |
| 2,587,676 | 3/1952 | Akers | 174/88 C X |
| 3,151,211 | 9/1964 | Reid et al. | 174/88 C X |

FOREIGN PATENTS OR APPLICATIONS

| | | | |
|---|---|---|---|
| 125,496 | 10/1947 | Australia | 174/71 C |
| 1,152,461 | 8/1963 | Germany | 174/88 C |
| 7,593 | 3/1909 | Great Britain | 174/92 |

*Primary Examiner*—Laramie E. Askin
*Attorney, Agent, or Firm*—Bruce C. Lutz

[57] ABSTRACT

A two-piece shield for a signal splitting pad wherein each of the two pieces is identical in shape. The two-piece shield, when secured, provides mechanical rigidity, mechanical protection to the pad, easy of assembly, and further provides a partial impedance match between the various shielded conductors used in the assembly.

7 Claims, 4 Drawing Figures

SHIELDING APPARATUS FOR A SIGNAL SPLITTER AND SIGNAL SPLITTER INCLUDING THE SAME

The present invention is directed to electrical apparatus and more specifically directed to the shielding of a signal splitting pad.

The common method in the prior art in connecting the shield of three shielded conductors connecting the shield in a signal splitting pad configuration was to solder a bare conductor from the shield of one conductor to the shield of the other conductors. The entire assembly including the ends of the conductors, the signal splitting resistors, and the common connection was then potted in a potting compound to provide mechanical and corrosive protection against the elements. The configuration previously used did not provide any electrical shielding of the elements comprising the splitting pad; and, before potting, did not provide any mechanical protection of the resistive elements. Further, due to the lack of rigidity of the previous structure before potting, there was considerable breakage in the device after soldering but before potting.

The present invention, on the other hand, utilizes two identical pieces of metal which are configured such that they can be juxtaposed the signal splitting pad with the resistors and wires aligning themselves within grooves formed in the two pieces of metal whereby the two pieces of metal can be locked together by alignment and fastening tabs before the pieces of metal are soldered to the shields of each of the cables and the device placed in a mold for potting. From the above description it will be noted that the pieces of metal provide a partial impedance match between the cables as well as providing shielding for the electrical components contained therein and further providing mechanical protection against breakage both due to bending, impact and shock.

It is, therefore, an object of the present invention to provide an improved means for holding and protecting a signal splitting pad during assembly and for shielding the apparatus and providing a better impedance match between the cables while in use.

Further objects and advantages of the present invention will be apparent from a reading of the specification and appended claims in conjunction with the drawings wherein:

Figure 1:
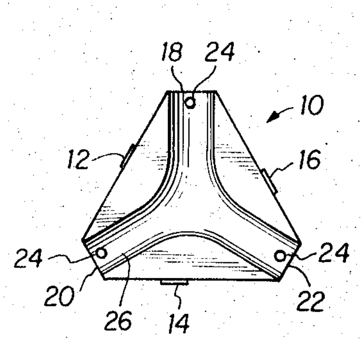
FIG. 1 is a plan view of a preferred embodiment of the invention.

In FIG. 1 a piece of metal generally designated as 10 has tabs or tongues 12, 14, and 16 on sides thereof which generally form a triangle with vertices 18, 20, and 22. As will be noted, each of the vertices contains a soldering hole 24. A common channel or groove 26 extends from vertex 20 to a common central point and then divides and extends to vertices 18 and 22. As will be noted, each of the tabs 12, 14 and 16 is closer to one of the vertices than any of the other tabs. Thus, tab 12 is closer to vertex 18 than is tab 16. Further, tab 16 is closest to vertex 22 while tab 14 is closest to vertex 20.

Figure 2:
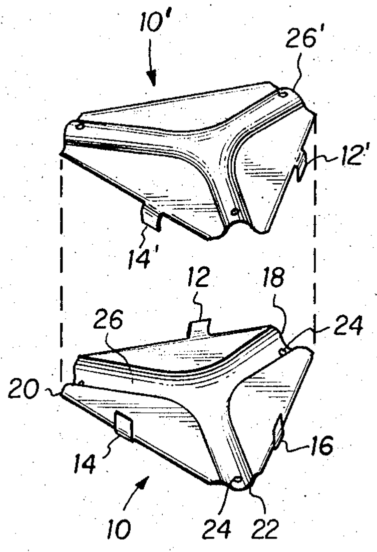
FIG. 2 is an isometric view of two of the pieces of metal of FIG. 1 in a position to be juxtaposed and the tabs bent as in the final configuration.

Referring to FIG. 2 each of the numbers used in FIG. 1 is reapplied to the piece of metal in the lower portion of FIG. 2. Since this piece of metal is identical with the other piece of metal, the primed number is applied where applicable to the other piece. It will be noted that if the two pieces of metal are juxtaposed, the two tabs 14 and 14' will be adjacent to each other but will not interfere with the juxtaposition of the two units.

Channels 26 and 26' will cooperate to form a conduit within which the splitting pad components can be placed.

Figure 3:
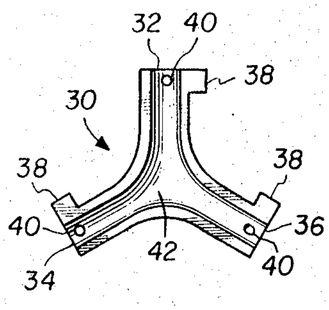
FIG. 3 is an alternate embodiment of the device of FIG. 1.

In FIG. 3 a device generally designated as 30 is illustrated which also has a generally triangular shape with legs 32, 34, and 36. On each of the legs 32, 34 and 36 there appears a tab 38. Further, on the end of each of the legs there appears a soldering hole 40. A central channel 42 is also apparent from the drawing. As will be noted, two of the devices 30 of FIG. 3 may also be used to enclose a splitting pad. While the configuration of FIG. 1 is a preferred embodiment, FIG. 3 will use slightly less metal. Since a preferred formation of the device is in a stamping machine, the stamping could be laid out to be slightly more economical of material used in the configuration of FIG. 3.

Figure 4:
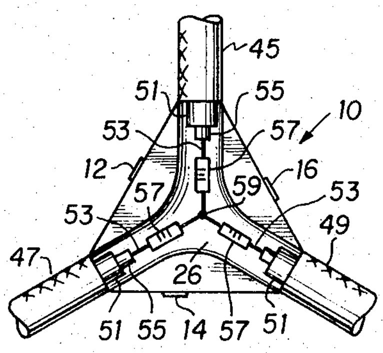
FIG. 4 is a plan view of the device of FIG. 1 with the splitting pad laid in the grooves thereof immediately before placement of the second metal piece on the upper surface thereof to enclose the pad.

In FIG. 4 the same numbers are used as in FIG. 1. In addition, it will be noted that cables or conductors 45, 47 and 49 are positioned at the vertices of the piece of metal 10. Extending from each of the cables is a piece of shielding material 51. This shielding material 51 is soldered to the piece of metal in conjunction with the soldering holes referred to in FIG. 1 as 24. As interior centrally located wire 53 in each of the cables is protected by an insulating material 55 in each of the cables between the central wire 53 and the shield 51. Each of the conductors or wires 53 is connected to one end of a resistor 57 and each of the resistors 57 is connected to a common junction point 59.

After the assembly of the device to the point of FIG. 4, a further piece of metal shown in FIG. 2 as 10' is juxtaposed with the piece of metal 10 and the tongues 12, 14 and 16 and 12', 14' and 16' are bent over to hold the two pieces of metal 10 and 10' in close proximity.

Locating the tabs 12, 14 and 16 along the sides of the piece of metal rather than at the vertices as shown in FIG. 3 allows the use of the device with higher frequency signals. As will be realized by those skilled in the art, the wavelengths of the signals decrease as a direct function of frequency. Further, the signals are radiated from a device whenever there is an opening which is larger than approximately one one-hundredth the wavelength of a signal. By reducing the size of the opening between the shields 51 of the conductors through the use of the tabs bent over the sides of the metal pieces 10 and 10', the total uninterrupted opening is decreased to approximately one-half or, upon further positioning of the tabs, to approximately one-third of that distance between the shield of the conductors involved in the splitting pad.

This is not to say that the embodiment of FIG. 3 is undesirable but merely that it will be more satisfactory at slightly lower signal frequencies than may be used with the embodiment of FIG. 1. If the tabs 12, 14 and 16 are placed just slightly off-center, they will abut one another on opposing pieces of metal and thus help position the two pieces for final assembly. Thus, there may be a need for a trade-off in extremely high frequency work between positioning the tabs adjacent each other for ease of assembly and spacing them slightly apart for reducing signal frequency radiation.

While two embodiments of the invention have been illustrated, other embodiments of this inventive concept will be apparent to those skilled in the art. Therefore, I wish to be limited not to the embodiment shown but only to the invention as described infra, wherein

I claim:

1. Apparatus for use in conjunction with shielding a signal splitting pad comprising:

a generally equilateral triangularly shaped piece of metal having three vertexes and three sides and a groove extending from one vertex to a common central portion in said piece of metal and thenceforth to the remaining two vertexes; and tab means located near the middle of each of the three sides, each of the tabs being offset on the side such that it is closer to one of the vertexes than any of the other tabs.

2. Apparatus as claimed in claim 1 wherein each of said vertexes includes a solder in said opening groove.

3. A signal splitter comprising, in combination:

signal splitter circuit means;

first and second substantially identical generally equilateral triangularly shaped pieces of metal each having three vertexes and three sides and each including channels extending from each of the vertexes to a common point interior said piece; and tongue means located on each of the three sides of each of said pieces and extending from the surface thereof in a direction opposite the channels, each of said tongue means being slightly offset from the median on a side whereby it is adjacent a corresponding vertex, said first and second pieces being juxtaposed over said circuit means with the circuit means located in said channels, said tongue means being bent, and acting to firmly hold said pieces together.

4. An assembly comprising, in combination:

a signal phase splitter including three shielded conductors;

means connecting said three conductors to a common point;

first generally equilateral triangularly shaped metal means having a given surface and having three channels formed in one direction from said given surface, the channels extending from a common point outwardly to the edges of said metal means and further having three tabs extending from an edge of said given surface near the middle of the edge and in a direction generally opposite said one direction, and said first metal means enclosing one side of said phase splitter; and second metal means, substantially identical to said first metal means, enclosing the other side of said phase splitter, and juxtaposed said first metal means, said tabs being bent inwardly and interlocking said first and second metal means to protect said phase splitter.

5. The assembly claimed in claim 4 comprising, in addition:

solder opening means at the extremity of each channel; and solder attaching said metal means to the shield of corresponding ones of the three shielded conductors.

6. The assembly of claim 4 wherein:

the means connecting the three conductors includes three resistive means;

the metal means are shaped with the channels extending in a direction to bisect each vertex thereof; and the tabs are offset from the middle on the sides of said pieces to prevent interference with the corresponding tabs on the juxtaposed pieces.

7. A signal splitter comprising, in combination:

three conductors each enclosed with shielding materials;

resistive means connecting each of said three conductors to a common point;

first and second substantially identical generally equilateral triangularly shaped tri-grooved metal means each enclosing about one-half the circumference to the shielding material of each of said three conductors, means attaching said first and second metal means together at points intermediate said grooves for reducing signal frequency loss; and solder means electrically connecting said metal means to the shielding material of each of said three conductors.

* * * * *